(12) United States Patent
Shi et al.

(10) Patent No.: US 12,427,602 B2
(45) Date of Patent: Sep. 30, 2025

(54) METHOD FOR REALIZING HIGH-SPEED CLADDING OF HOLLOW OFFSET-FOCUS ANNULAR LASER

(71) Applicant: Soochow University, Suzhou (CN)

(72) Inventors: Tuo Shi, Suzhou (CN); Rongwei Zhang, Suzhou (CN); Geyan Fu, Suzhou (CN); Shihong Shi, Suzhou (CN); Yu Wang, Suzhou (CN)

(73) Assignee: Soochow University, Suzhou (CN)

( * ) Notice: Subject to any disclaimer, the term of this patent is extended or adjusted under 35 U.S.C. 154(b) by 839 days.

(21) Appl. No.: 17/722,063

(22) Filed: Apr. 15, 2022

(65) Prior Publication Data
US 2022/0371124 A1    Nov. 24, 2022

(30) Foreign Application Priority Data
May 11, 2021 (CN) .......................... 202110510453.9

(51) Int. Cl.
| | | |
|---|---|---|
| B23K 26/342 | (2014.01) | |
| B22F 7/04 | (2006.01) | |
| B23K 26/06 | (2014.01) | |
| B23K 26/073 | (2006.01) | |
| B23K 26/14 | (2014.01) | |

(52) U.S. Cl.
CPC .............. *B23K 26/342* (2015.10); *B22F 7/04* (2013.01); *B23K 26/0643* (2013.01); *B23K 26/0734* (2013.01); *B23K 26/14* (2013.01)

(58) Field of Classification Search
CPC .. B23K 26/342; B23K 26/0643; B23K 26/34; B23K 26/144; B23K 26/14; B23K 26/1476; B23K 26/702; B23K 26/0604; B23K 26/0608; B23K 26/067; B23K 26/0734; B23K 26/32; B23K 26/06; B23K 26/032; B23K 26/0665; B23K 26/1462; B23K 26/0884; B23K 26/36; B23K 26/703; B23K 26/704
USPC .............. 219/121.74, 121.6, 121.64, 121.76, 219/121.83, 74, 76.14
See application file for complete search history.

(56) References Cited

U.S. PATENT DOCUMENTS

| | | | | |
|---|---|---|---|---|
| 5,121,329 A | * | 6/1992 | Crump ................... | B33Y 30/00 228/180.5 |
| 5,362,427 A | * | 11/1994 | Mitchell, Jr. ........... | B22F 3/115 264/109 |
| 5,418,350 A | * | 5/1995 | Freneaux ............. | B23K 26/144 219/121.84 |

(Continued)

*Primary Examiner* — Chris Q Liu
(74) *Attorney, Agent, or Firm* — Nixon Peabody LLP

(57) ABSTRACT

A method for realizing high-speed cladding of hollow offset-focus annual laser. The method includes the following steps: dividing laser into annual light, and forming an offset-focus annual light spot after the annual light is focused, which acts on a surface of a matrix; during cladding for the surface of the matrix, selecting laser parameters according to different materials; after every cladding, making a shift by 20-80% of the diameter of the light spot in a vertical direction of a scanning speed of the laser; in the cladding process, selecting shielding gas for protection, and blowing the shielding gas to the molten powder in the air to spray the molten powder in air towards the surface of the matrix at a certain speed so that the cladding layer and the matrix are bonded firmly, and cladding the surface of the matrix to form a coating layer.

10 Claims, 6 Drawing Sheets

(56) References Cited

U.S. PATENT DOCUMENTS

| | | | | |
|---|---|---|---|---|
| 5,961,862 A * | 10/1999 | Lewis | ................ | B23K 26/1476 |
| | | | | 219/121.84 |
| 5,993,549 A * | 11/1999 | Kindler | ................. | B23K 26/144 |
| | | | | 219/121.84 |
| 6,405,095 B1 * | 6/2002 | Jang | ..................... | B29C 64/165 |
| | | | | 264/633 |
| 6,504,127 B1 * | 1/2003 | McGregor | ............. | B33Y 30/00 |
| | | | | 219/121.64 |
| 6,756,561 B2 * | 6/2004 | McGregor | ......... | B23K 26/0608 |
| | | | | 219/121.64 |
| 7,259,353 B2 * | 8/2007 | Guo | ..................... | B23K 26/144 |
| | | | | 219/121.84 |
| 7,626,136 B2 * | 12/2009 | Sato | ..................... | B23K 26/144 |
| | | | | 219/121.84 |
| 9,168,613 B2 * | 10/2015 | Colby | ................... | B23K 26/32 |
| 2003/0075529 A1 * | 4/2003 | Mazumder | ............. | B23K 26/06 |
| | | | | 219/121.74 |
| 2003/0116542 A1 * | 6/2003 | McGregor | ......... | B23K 26/0608 |
| | | | | 219/121.64 |
| 2005/0056628 A1 * | 3/2005 | Hu | ..................... | B23K 26/144 |
| | | | | 219/121.84 |
| 2009/0102098 A1 * | 4/2009 | Adams | .................. | B33Y 40/00 |
| | | | | 425/166 |
| 2012/0266814 A1 * | 10/2012 | Clark | ................ | B23K 26/0732 |
| | | | | 118/620 |
| 2017/0232518 A1 * | 8/2017 | Shi | ...................... | B23K 26/342 |
| | | | | 419/7 |
| 2022/0362885 A1 * | 11/2022 | Shi | .................... | B23K 26/0665 |
| 2022/0371124 A1 * | 11/2022 | Shi | ......................... | B22F 10/25 |

\* cited by examiner

METHOD FOR REALIZING HIGH-SPEED CLADDING OF HOLLOW OFFSET-FOCUS ANNULAR LASER

CROSS REFERENCE TO RELATED APPLICATION(S)

This patent application claims the benefit and priority of Chinese Patent Application No. 202110510453.9, filed on May 11, 2021, the disclosure of which is incorporated by reference herein in its entirety as part of the present application.

TECHNICAL FIELD

The disclosure relates to a method for realizing high-speed cladding of hollow offset-focus annular laser, which relates to the technical field of laser processing.

BACKGROUND OF THE INVENTION

A high-speed cladding technology is a new technology for preparing high-performance coating layers, and its rapid development in recent years has attracted widespread attention from the market. Different from the conventional laser cladding technology, the principle of the conventional laser cladding is that laser melts metal powder particles and a matrix material on a surface of a matrix together, and the molten pool is condensed to form the cladding layer. During the cladding, the metal powder is generally sprayed directly into the molten pool on the surface of the matrix. The powder particles absorb little energy before reaching the molten pool. The rest energy acts on the matrix body to generate an extremely large heat-affected zone on the surface of the matrix, which reduces the performance of the matrix material itself. The principle of high-speed laser cladding is exactly the opposite of the conventional cladding. Nowadays, this technology mostly uses positive defocusing (that is, a focus of the laser is located above the matrix material). The powder absorbs most of the laser energy in the air and becomes a molten state, and the small part of remaining energy acts on the surface of the matrix. Finally, the cladding layer has a low dilution rate, a small stress, and a low crack formation rate, which also makes the matrix have small thermal deformation, so as to better protect the matrix. Since the main energy of the laser acts on metal powder, the high-speed laser cladding technology is faster and more efficient than the conventional laser cladding.

Meanwhile, due to the advantages of high laser energy density and high bonding strength between the coating layer and a matrix, a dense metal coating layer can be formed on the surface of the matrix, so that production of pores and cracks in the coating layer is avoided, and the wear resistance and corrosion resistance of the surface of a workpiece are improved. It is an energy-saving and environmentally friendly green restoration method. However, due to its disadvantages of low cladding efficiency, large dilution rate, low powder utilization rate, cumbersome post-machining procedures, and the like, the traditional laser cladding technology has not been widely used in manufacturing. High-speed laser cladding is known as an advanced green manufacturing technology that can replace a traditional metal surface modification process. The cladding efficiency is 3-5 times that of the traditional laser cladding. Ultra-thin and high-quality coating layers with a highly smooth surface can be prepared, can be put into operation by simple grinding and polishing, and have a wide application prospect.

The existing high-speed laser cladding technology is based on outside-beam powder feeding, that is, a beam is centered, and powder is distributed around for coaxial lateral feeding. For example, in the patent CN108103498A "an ultra-high-speed laser cladding process", the posture of a laser head remains unchanged in the cladding process, and a surface coating layer is mainly generated by high-speed rotation of a roller, which is not suitable for generation of a coating layer on an irregular part surface. In the patent CN102409338B "A rapid cladding method of double beam narrow spot laser with the same wavelength", free-form surface cladding cannot be performed, the cladding process is cumbersome and complex, and the utilization rate of laser energy is low. In the patent "a dual-focus high-speed laser cladding method", a dual-focus focusing mirror is used to converge two laser beams in the air. Although the powder can be irradiated in a large area, only the coaxial lateral powder feeding can be used as a powder feeding method. It is also not conducive to the generation of a coating layer on an irregular part surface.

In the existing art, a core component for realizing optical powder coupling forming is a laser cladding sprayer head device. At present, there are two powder feeding technologies for a laser cladding sprayer head: one is a coaxial inclined powder feeding method using multiple powder spraying pipes to surround a solid light (outside-beam powder feeding), and the other one is a vertical powder feeding method using a hollow annular light to surround a single powder spraying pipe (inside-beam powder feeding). This invention is developed for a device involved in the second inside-beam powder feeding method.

In a focusing device with inside-beam coaxial powder feeding No. 201621159526.5, a collimator, a conical straight-surface mirror, and an annular focusing parabolic mirror are installed in sequence behind a laser beam exit; the two mirrors are both of rotationally symmetric structures around a central axis, and their reflecting surfaces are arranged oppositely. A laser beam with a certain angle emitted by a laser device is collimated into a parallel circular beam by the collimator; the circular beam is reflected by the conical straight-surface mirror to the annular focusing parabolic mirror and shaped into an annular focusing beam annular, which is finally focused on a working surface to form a light spot at the focal position. However, during general working, according to the needs, the working surface should be at an upper or lower defocused position of the focus, so that a hollow circular light spot with a certain size is formed on a cross section of the beam to form a molten pool with a desired size, which melts the powder material sprayed from a powder nozzle; and the hollow annular light spot makes the peak of center energy of an original solid light spot shift outwards to reinforce the energy on the outer side of the light spot.

When high-speed cladding is performed in a non-offset-focus and positive defocus state, the relative movement speed is much higher than that of traditional cladding, which will cause part of the powder to pass through the focus and be heated for shorter time and insufficiently, so that a large amount of powder cannot be melted and will be popped up after hitting the matrix, resulting in low powder utilization rate, generally about 50%; furthermore, the cladding layer has high roughness, a considerable amount of laser energy is absorbed by the substrate material the powder is mixed and combined by melting the matrix material, which causes low utilization efficiency of the laser energy; at the same time, the energy absorbed by the center of the powder is not enough under a large defocusing amount, so that the powder is still solid particles when combined with the matrix material, and the surface smoothness of a finished product is poor. In order to improve the cladding efficiency, the laser power is increased, and a light spot area is enlarged, but this will increase the deformation of a workpiece, and it is necessary to reserve a larger mechanical allowance; and the dilution rate of the conventional laser cladding layer is high, which reduces the performance of the cladding layer.

Compared with the traditional high-speed laser cladding method with outside-beam powder feeding, the high-speed laser cladding method with inside-beam powder feeding has the following characteristics: divergent laser is converted into parallel light by a collimator system, and the incident parallel light is dispersed into uniform annular light by a beam splitter and irradiates the annular parabolic focusing mirror; the focused beam is converged into a hollow annular light. The hollow annular light path has a large internal space, which can accommodate a complete set of circulation system of powder, air, cooling water, and the like, which not only reduces the volume of the entire cladding sprayer head; moreover, a powder spraying pipe is located on the center axis of the nozzle, and the powder spraying pipe has an annular collimation shielding gas pipe on the outer side, thus forming the sprayer head together; under the common action of the gravity of the powder particles and the powder carrying air, the dispersion degree of a powder beam is small, and coaxial light, powder, air integration is better realized. However, the following problems currently exist:

In the traditional cladding process, most of the laser energy is mainly absorbed by the cladding powder and the matrix. Because of different physical parameters and thermal expansion coefficients between different materials, an extremely high residual stress is often generated in the cladding layer. A cracking phenomenon occurs easily in the cladding process or at the end of cladding, thereby affecting the hardness, the corrosion resistance, the wear resistance, and other properties of the coating layer. This problem has always been a major difficulty in the traditional laser cladding. Therefore, in order to solve the above difficulty, the dilution rate is a factor that must be controlled for high-speed cladding, and the dilution rate represents the percentage of a dilution zone in the entire cladding zone. Since in the entire cladding zone, the dilution zone is mainly distributed below the surface of the matrix, the dilution rate is usually calculated by using a measured value of a cross-sectional area, and the formula of the dilution rate can be simplified as $$\eta = \frac{S_2}{S_1 + S_2} = \frac{W \cdot h}{W \cdot (H + h)} = \frac{h}{H + h} \times 100\%$$

Therefore, it is necessary to reduce the dilution rate by controlling the depth of the dilution zone of the cladding layer, so that the heat input of the laser to the workpiece can be reduced under the high-speed cladding, and the thermal deformation of the matrix is small. The high-speed cladding can be used for machining thin-walled parts, small parts, and other parts which cannot be machined by the traditional cladding.

Moreover, the diameter of a laser spot for inside-beam powder feeding cannot be too large (that is, the defocusing amount cannot be too large), otherwise, the powder cannot be fully melted because of a small laser energy density per unit area, so sticking and holes will be more likely to occur, which make the cladding layer and the matrix have an adhesion defect. The powder is irradiated in the laser beam. Since the light spot energy in different zones is different in the hollow annular light path, there will be several states when the powder passes through the laser beam and falls on the surface of the matrix: 1. The powder particles are completely melted into a droplet state when they are fully heated. 2. The powder particles are partially melted when they are not fully heated, and the remaining powder particles absorb heat during mixing with the molten liquid and are finally melted. 3. The powder particles are heated severely insufficiently and even are still solid particles because they are not melted. Under normal circumstances, powder particles that are melted into a liquid form will be adhered to the surface of the matrix when they are dropped on the surface; powder particles that are not fully heated hit the surface of the matrix and will be popped out, and sparks will be splashing. Some particles that are not fully heated enter the molten pool and continue to be heated and melted. The state of the powder particles reaching the surface of the matrix has a great influence on the quality of the final coating layer formed by cladding.

However, since the traditional light path is not an offset-focus light path, the focus of the laser is very small. As shown in FIG. 1, since the high-speed cladding (24-72 m/min) is performed in a positive defocusing state, the relative movement speed of which is much higher than that of the traditional cladding (0.5-3 m/min), it will cause part of the powder to be heated for shorter time when the powder passes through the focus and be insufficiently heated. In the cladding forming process, the residual stress caused by a temperature difference and a phase change is easy to cause, and pores, cracks, and the like in the cladding layer are formed.

In summary, the traditional laser cladding is shown in FIG. 2. The molten pool formed during cladding is below the focus of the laser, and most of the laser energy is mainly absorbed by the matrix, causing a larger molten pool and dilution rate. The offset-focus high-speed cladding state is shown in FIG. 3. The powder beam passes through the focus of the laser during the cladding, so that in a high-speed scanning state, the powder beam can absorb part of the laser energy to achieve a preheating effect. However, since the traditional light path is not an offset-focus light path, the focus of the laser is very small, and part of the powder is insufficiently melted when passing through the focus. At the same time, as with the traditional laser cladding, under a larger defocusing amount, the laser spot has a larger duty ratio, causing insufficient melting of powder in the middle, resulting in a defect in the middle of a melting path.

Therefore, it is urgent to provide a new method for realizing high-speed cladding of hollow offset-focus annular laser to solve the above-mentioned problems in the existing art.

SUMMARY

The present disclosure aims to provide a method for realizing high-speed cladding of hollow offset-focus annular laser, so as to solve the above problems in the existing art. An annular off-axis parabolic focusing mirror horizontally shifts to change a focus position of a parent parabola, so as to realize uniformness of an energy density of an annular light spot, enhance a laser beam and powder coupling effect, and improve the metal powder utilization rate and the cladding quality and appearance.

In order to achieve the above objective, the present disclosure provides the following solution: the present disclosure provides a method for realizing high-speed cladding of hollow offset-focus annular laser, including the following steps:

step I, dividing laser into annular light, and forming an offset-focus annular light spot after the annular light is focused, which acts on a surface of a matrix.

step II, during cladding for the surface of the matrix, selecting laser parameters according to different materials.

step III, placing a powder spraying pipe vertically downward to provide powder.

step IV, performing laser scanning; after every cladding, making a shift by 20-80% of the diameter of the light spot in a vertical direction of a scanning speed of the laser.

step V, repeating steps II to IV according to different requirements for the thickness of a coating layer.

step VI, in the cladding process, in order to prevent a cladding layer from being oxidized, selecting shielding gas for protection, and blowing the shielding gas to the powder molten in air to spray the powder molten in the air towards the surface of the matrix at a certain speed so that the cladding layer and the matrix are bonded firmly; and step VII, cladding the surface of the matrix to form a coating layer.

Preferably, in step I, the laser is divided into the annular light through a beam splitter, and the annular light is focused again by a mirror to form the offset-focus annular light spot.

Preferably, the mirror includes a conical mirror and an annular off-axis parabolic focusing mirror; the conical mirror faces the annular light; and the annular off-axis parabolic focusing mirror and the conical mirror are oppositely and coaxially disposed.

Preferably, in step I, the annular off-axis parabolic focusing mirror horizontally shifts to change the focus position of the parent parabola; by adopting a positive defocusing process, the powder enters a molten pool on the surface of the matrix after being fully heated by a focus of laser.

Preferably, in step II, the laser parameters include laser power, a defocusing amount, and a diameter of the light spot; the laser powder is 0.8 KW to 4 KW; the defocusing amount is 0-+3; and the diameter of the light spot is 1 mm-3.8 mm.

Preferably, in step III, the powder spraying pipe is centered and has a powder supply rate of 10-50 g/min; a distance from a powder exit of the powder spraying pipe to the focus of the laser is 5-10 mm; and the powder has a particle size of 18-53 um.

Preferably, in step IV, the scanning speed of the laser is 0.15-0.6 m/s.

Preferably, in step VI, the shielding gas adopts rare gas, 0.1-0.3 bar.

Preferably, the shielding gas is nitrogen or argon.

Preferably, in step VII, the matrix is a pipe; a nozzle is located right above the pipe and constantly moves in an axial direction of the pipe to form a threaded overlap cladding layer.

or, the matrix is a vertical plane, and the sprayer head performs high-speed cladding on a vertical plane to generate a surface coating layer.

or, the matrix is an irregular curved surface, and the sprayer head performs free-form fabrication on the irregular curved surface.

Compared with the present disclosure, the following beneficial technical effects are achieved in the existing art.

In the present disclosure, the size of a working light spot can be adjusted according to a desired power and power density; it is ensured that the working light spot is a small-duty-ratio annular light spot or solid light spot while the diameter of the adjusted light spot is increased; therefore, in a scanning forming process, the defect that a scanning line has high energy in the center and low energy on the outer side can be improved, thus finally providing a high-speed laser cladding with inside powder feeding, which has high cladding efficiency achieved by the light spot that can be enlarged, high powder utilization rate, and high yield, and can obtain a cladding coating layer with a flat surface and high binding force. Meanwhile, due to the characteristics that beams are hollow, and powder is centered, free-form fabrication can be realized on the irregular curved surface. The present disclosure can replace traditional industries such as electroplating that causes severe pollution and solve the disadvantages of poor adhesion of plasma spraying, low efficiency of traditional laser cladding, and the like.

BRIEF DESCRIPTION OF THE DRAWINGS

To describe embodiments of the present disclosure or technical solutions in the existing art more clearly, the drawings required to be used in the embodiments will be briefly introduced below. It is apparent that the drawings in the descriptions below are only some embodiments of the present disclosure. Those of ordinary skill in the art also can obtain other drawings according to these drawings without making creative work.

Figure 1:
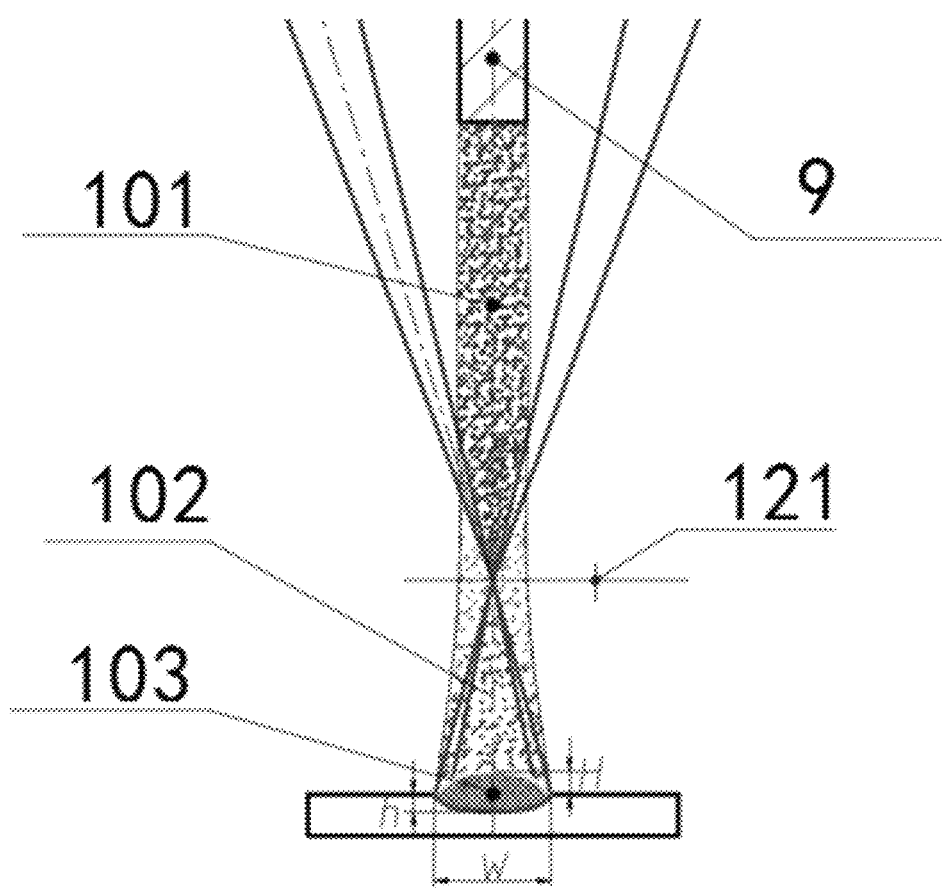
FIG. 1 is a principle diagram of inside-beam non-offset-focus laser in the existing art.
Figure 2:
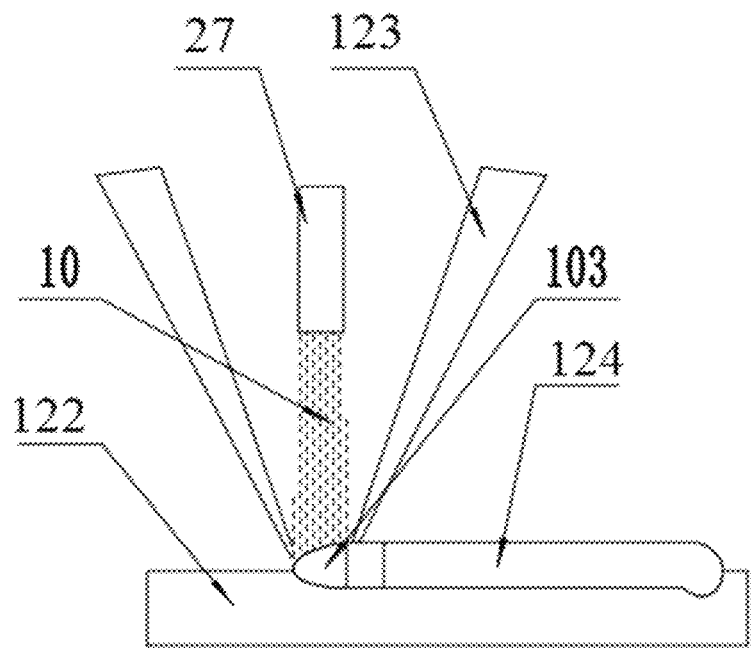
FIG. 2 is a principle diagram of traditional laser cladding.
Figure 3:
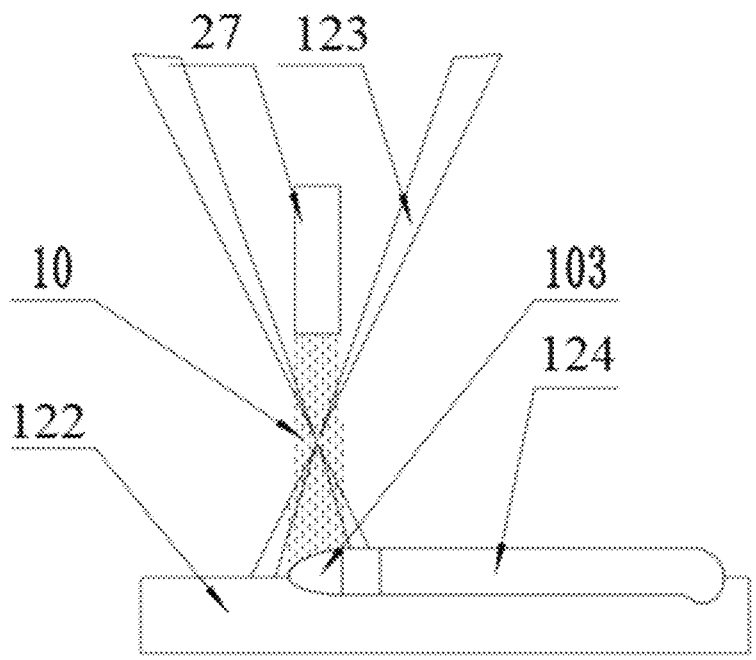
FIG. 3 is a principle diagram of inside-beam non-offset-focus laser cladding.

In the drawings: 1: optical fiber outlet; 3: collimator; 6: center line of optical axis; 7: annular off-axis parabolic focusing mirror; 9: nozzle; 10: powder beam; 27: powder spraying pipe; 101: unheated powder; 102: heated powder; 103: molten pool; 104: wide small-duty-ratio light spot position; 105: largest solid light spot position; 106: smallest solid light spot position; 107: original paraboloid; 108: current paraboloid; 109: focusing plane; 110: circular focusing ring; 111: light energy distribution of largest solid light spot; 112: light energy distribution of smallest solid light spot; 113: light energy distribution of light spot under positive defocusing; 114: light energy distribution of light spot under negative defocusing; 121: laser focus plane; 122: matrix; 123: laser; 124: cladding layer.

DETAILED DESCRIPTION OF THE EMBODIMENTS

The following clearly and completely describes the technical solution in the embodiments of the present disclosure in combination with the accompanying drawings of the embodiments of the present disclosure. Apparently, the described embodiments are only part of the embodiments of the present disclosure, not all embodiments. Based on the embodiments in the present disclosure, all other embodiments obtained by those of ordinary skill in the art without creative work shall fall within the protection scope of the present disclosure.

The present disclosure aims to provide a method for realizing high-speed cladding of hollow offset-focus annular laser, so as to solve the above problems in the existing art. By means of changing a horizontal size of an annular parabolic focusing mirror, i.e., changing an offset-focus amount of a parent parabola focus, and realizing uniformness of an energy density of an annular light spot, a laser beam and powder coupling effect is enhanced, and the metal powder utilization rate and the cladding quality and appearance are improved.

In order to make the above-mentioned purposes, characteristics and advantages of the present disclosure more obvious and understandable, the present disclosure is further described in detail below with reference to the accompanying drawings and specific implementation modes.

Embodiment I

As shown in FIGS. 4-8, this embodiment provides a method for realizing high-speed cladding of hollow offset-focus annular laser, including the following steps.

Step I, a beam splitter is used to shape laser 123 into annular light; the annular light is re-focused into an offset-focus annular light spot by a mirror, which acts on a surface of a matrix 122. In this embodiment, by changing the horizontal dimension of the annular parabolic focusing mirror, i.e., changing an offset-focus amount of a parent parabolic focus, an offset-focus light path to enlarge a zone intersecting with the laser 123 is formed, and powder is heated fully by a focus of laser. Specifically, in this embodiment, during machining of an annular off-axis parabolic focusing mirror 7, a horizontal feed depth of a turning tool is reduced, so as to change the horizontal position of the annular off-axis parabolic focusing mirror 7 (i.e., change the size of an annular through hole in the middle of the annular off-axis parabolic focusing mirror 7), which makes the parent parabolic focus horizontally shift.

Figure 4:
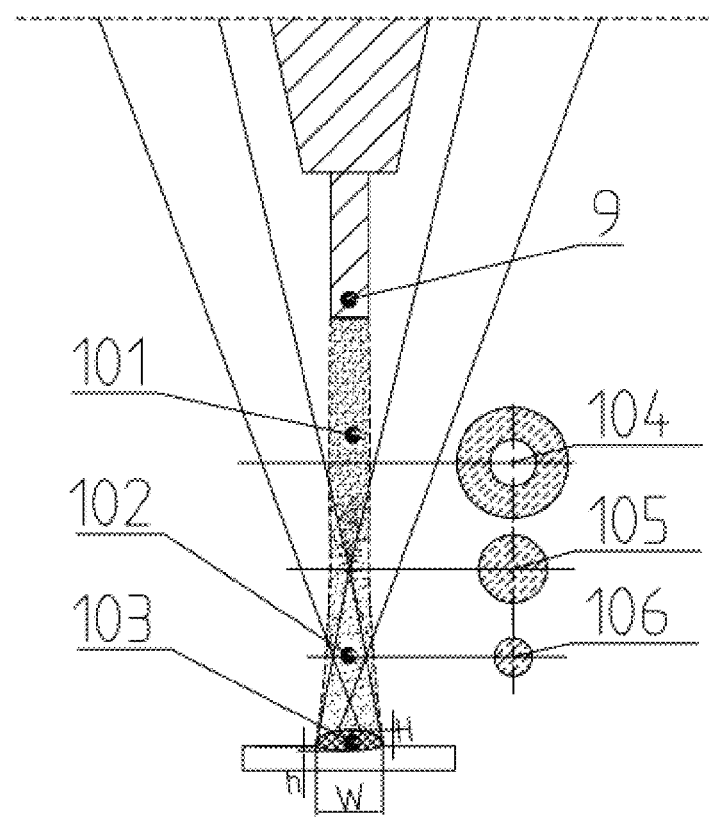
FIG. 4 is a diagram of heating of powder in high-speed inside-beam offset-focus laser cladding of the present disclosure.

As shown in FIG. 4, in this embodiment, values of dilution rates of a single path and an overlapping layer obtained by high-speed offset-focus laser cladding with inside-beam powder feeding are relatively small; a cladding material and a material of the matrix 122 are stirred and mixed in a molten pool 103, and there will be many elements in the matrix 122 diffusing upwards.

In this embodiment, a powder spraying pipe 27 is centered, so a powder beam 10 has good converging property, and a coating layer can be freely formed on an irregular curved surface. In this embodiment, by adopting a positive defocusing process, powder enters the molten pool 103 on the surface of the matrix 122 after being fully heated by the focus of the laser 123.

Step II, during surface cladding of the matrix 122, according to different materials, the power of the laser 123 is 0.8 KW-4 KW; a defocusing amount is 0-+3; and a diameter of a light spot is 1 mm-3.8 mm.

Step III, a powder feeding rate is 10-50 g/min; the powder spraying pipe 27 is vertically downward; a distance from a powder exit to the focus of the laser 123 is 5-10 mm; and the powder has a particle size of 18-53 um.

Step IV, a scanning speed of the laser 123 is 0.15-0.6 m/s; after each cladding, a shift is made by 20-80% of the diameter of the light spot in a vertical direction of the scanning speed of the laser 123.

Step V, steps II to IV are repeated according to different requirements for the thickness of a coating layer, so as to acquire appropriate satisfactory process parameters.

Step VI, in the cladding process, in order to prevent a cladding layer 124 from being oxidized, nitrogen, argon, or other rare gas is selected for protection. The amount of the shielding gas should not be tool large or too small; if the amount of the shielding gas is too large, there will be air pores in the cladding layer 124; if the amount of the shielding gas is too small, it cannot reach a shielding range, which makes the cladding layer 124 oxidized. The shielding gas is preferably 0.1-0.3 bar. Meanwhile, the shielding gas is blown to the molten powder in the air, and the powder is sprayed towards the surface of the matrix 122 at a certain speed, so the cladding layer 124 and the matrix 122 are bonded more firmly.

Step VII, after good process parameters of the cladding layer 124 are obtained on the plane, the surface of the pipe or other matrix 122 can be cladded to form a coating layer.

Figure 6:
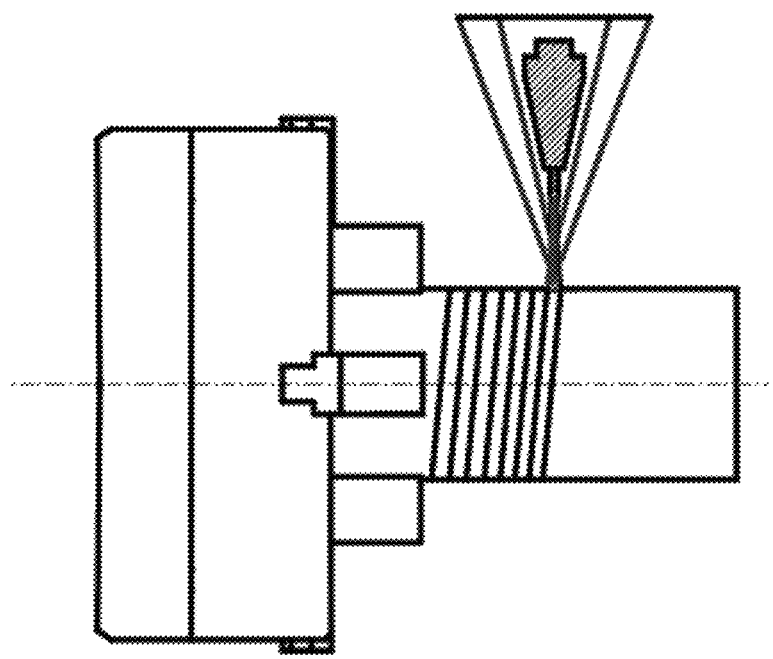
FIG. 6 is a schematic diagram of formation of a threaded overlap cladding layer in an axial direction of a pipe of the present disclosure.
Figure 7:
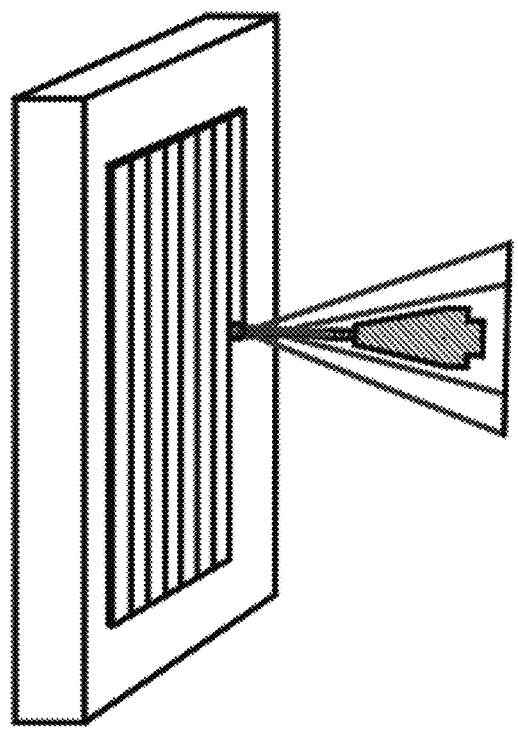
FIG. 7 is a schematic diagram of high-speed cladding on a vertical plane to form a surface coating layer.
Figure 8:
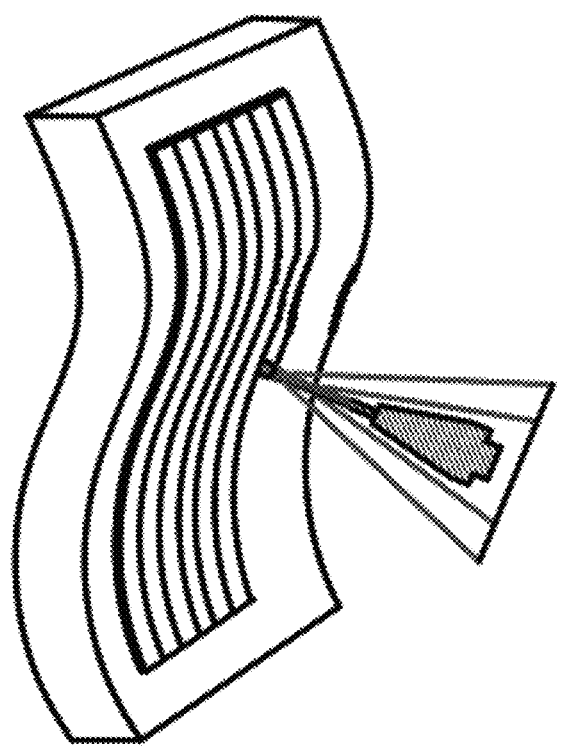
FIG. 8 is a schematic diagram of free-form fabrication on an irregular curved surface of the present disclosure.

As shown in FIG. 6, a nozzle is located right above the pipe and constantly moves at a certain speed in the axial direction of the pipe to form a threaded overlap layer 124. High-speed cladding is performed on the vertical plane to generate a surface coating layer, as shown in FIG. 7. Free-form fabrication can be performed on the irregular curved surface, as shown in FIG. 8.

In the present disclosure, by means of changing the horizontal size of the annular parabolic focusing mirror, i.e., changing the offset-focus amount of the parent parabolic focus, an annular light spot or solid working light spot with a larger diameter but a smaller duty ratio is formed on a working plane with a positive defocusing amount. The duty cycle of the light spot near the positive and negative defocusing of the focus of the laser is reduced, so that the diameter of the solid focusing light spot at the focus of the laser is increased, and an upper limit of a melting width is increased; and furthermore, the light energy distribution on the working light spot can be adjusted according to the needs of working conditions, thereby realizing uniformness of an energy density of an annular light spot, enhancing a laser beam and powder coupling effect, and improving the metal powder utilization rate and the cladding quality and appearance.

In addition, by means of changing the defocusing amount of the working plane, continuous changes from a large-size hollow annular light to a large-size solid annular light can be realized. The focusing form of the focus of the laser is changed by an offset-focus method; a small focus is transformed into a large focusing light spot; a preheatable height range of the solid light is increased; the preheating duration of the powder in a positive defocusing state of the high-speed cladding is prolonged; and the powder particles are fully heated and melted into a droplet state before reaching the matrix 122, which reduces the rebound of the unmelted powder on the matrix 122 and improves the utilization rate and cladding efficiency of the powder. Due to the characteristics of an offset-focus beam for inside-beam powder feeding, the highest point of the energy density of its laser 123 is no longer a small focus, but a focusing light spot with a uniform energy density. The high-speed laser cladding works in the positive defocusing range. The powder will firstly pass through the converged focus after being sprayed from the powder spraying pipe 27. On the one hand, the purpose of preheating is achieved by shielding a part of the laser beam, and on the other hand, such a phenomenon that an extremely large dilution rate is generated after excessive energy is absorbed by the matrix 122 during cladding of a coating layer by the laser 123 is avoided, so that an offset-focus beam can be used to better melt the powder and reduce the dilution rate of the matrix 122.

In summary, the present disclosure provides a new green technological method for rapidly cladding a free-form curved surface on a metal surface to generate a wear-resistant thinner coating layer with high metallurgical bond ability.

It should be noted that light path parameters include an off-axis angle, an internal light path focusing half-angle, a defocusing amount of the parent parabolic focus, a radius of an upper light path, and a radius of a lower light path. The off-axis angle depends on the selection of a parent parabolic cross section and a width of a parent parabola. Selecting a cross section closer to a parabolic axis will cause a smaller off-axis angle and selecting a parabolic cross section closer to the focus will make a shorter distance between the center of the mirror and the focus; and the width of the parent parabola also affects the focal length, that is, if the parabola is wider, the focal length is longer. Therefore, to control the focal length, it is necessary to select the position of the cross section and the width of the parent paraboloid reasonably.

Figure 5:
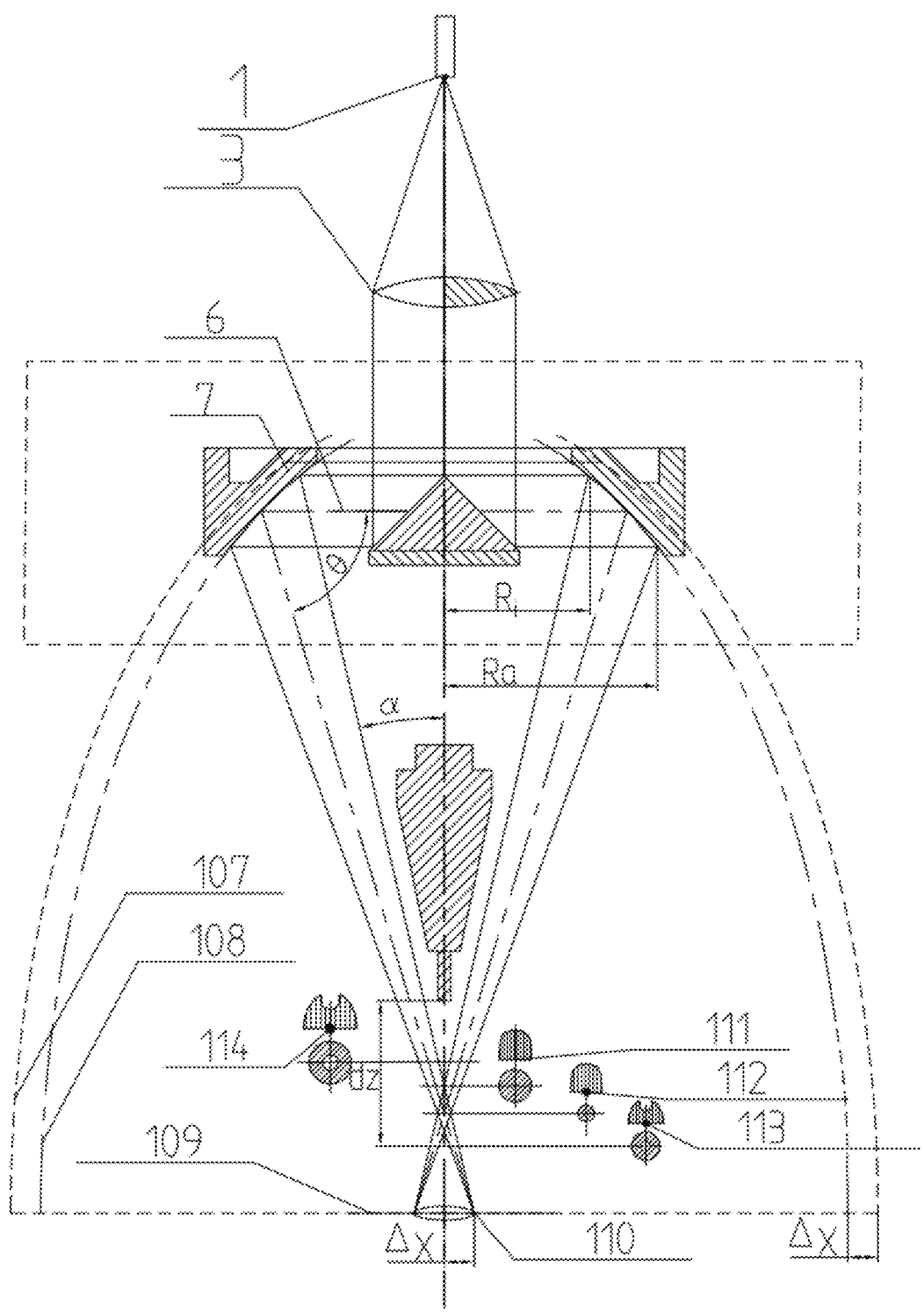
FIG. 5 is a principle diagram of hollow annular offset-focus laser of the present disclosure.

In addition, by means of changing the horizontal size of the annular parabolic focusing mirror, i.e., changing the defocusing amount of the parent parabolic focus, the radiuses of the upper and lower light paths of the annular off-axis parabolic focusing mirror 7 will be eventually affected, which will shift the focus. Thus, the annular light spot or solid working light spot with the larger diameter but the smaller duty ratio is formed on the working plane with the positive defocusing amount; the size of the working light spot can be adjusted according to the desired power and power design; and it is ensured that the working light spot is a small-duty-ratio annular light spot or solid light spot while the diameter of the adjusted light spot is increased, as shown in FIG. 5.

It should be noted that for those skilled in the art, it is apparent that the present disclosure is not limited to the details of the demonstrative embodiments mentioned above, and that the present disclosure can be realized in other specific forms without departing from the spirit or basic features of the present disclosure. Therefore, from any point of view, the embodiments should be regarded as exemplary and non-limiting. The scope of the present disclosure is defined by the appended claims rather than the above description. Therefore, all changes falling within the meanings and scope of equivalent elements of the claims are intended to be included in the present disclosure, and any reference sign in the claims shall not be regarded as limiting claims involved.

The principle and implementation modes of the present disclosure are described by applying specific examples in the present disclosure. The descriptions of the above embodiments are only intended to help to understand the method of the present disclosure and a core idea of the method. In addition, those ordinarily skilled in the art can make changes to the specific implementation modes and the application scope according to the idea of the present disclosure. From the above, the contents of the specification shall not be deemed as limitations to the present disclosure.

What is claimed is:

1. A method for realizing high-speed cladding of hollow offset-focus annular laser, comprising the following steps:
    step I, providing a laser by a laser device, dividing the laser into annular light, and forming an offset-focus annular light spot after the annular light is focused, which acts on a surface of a matrix;
    step II, selecting laser parameters according to different materials;
    step III, placing a powder spraying pipe vertically downward and supplying powder to the surface of the matrix;
    step IV, performing laser scanning to form a respective cladding layer; after every respective cladding layer is formed, making a shift by 20-80% of a diameter of the light spot in a vertical direction of a laser scanning;
    step V, repeating steps II to IV to create cladding layers with different thicknesses by controlling a number of times of repeating steps II to IV defining a cladding process;
    step VI, in the cladding process, in order to prevent the respective cladding layer from being oxidized, selecting shielding gas for protection, and blowing the shielding gas to the powder molten in air to spray the powder molten in the air towards the surface of the matrix at a certain speed so that the respective cladding layer and the matrix are bonded firmly; and
    step VII, cladding the surface of the matrix to form a coating layer from the created cladding layers.

2. The method for realizing the high-speed cladding of the hollow offset-focus annular laser according to claim 1, wherein in step I, the laser is divided into the annular light through a beam splitter, and the annular light is focused by a mirror to form the offset-focus annular light spot.

3. The method for realizing the high-speed cladding of the hollow offset-focus annular laser according to claim 2, wherein the mirror comprises a conical mirror and an annular off-axis parabolic focusing mirror; the conical mirror faces the annular light; and the annular off-axis parabolic focusing mirror and the conical mirror are oppositely and coaxially disposed.

4. The method for realizing the high-speed cladding of the hollow offset-focus annular laser according to claim 3, wherein in step I, the annular off-axis parabolic focusing mirror horizontally shifts to change a focus position of a parent parabola; and by adopting a positive defocusing process, the powder enters a molten pool on the surface of the matrix after being fully heated by a focus of laser.

5. The method for realizing the high-speed cladding of the hollow offset-focus annular laser according to claim 1, wherein in step II, the laser parameters comprise laser power, a defocusing amount, and a diameter of the light spot; the laser power is 0.8 KW to 4 KW; the defocusing amount ranges from 0 to +3; and the diameter of the light spot ranges from 1-3.8 mm.

6. The method for realizing the high-speed cladding of the hollow offset-focus annular laser according to claim 1, wherein in step III, the powder spraying pipe is centered and has a powder supply rate of 10-50 g/min; a distance from a powder exit of the powder spraying pipe to a focus of the laser is 5-10 mm; and the powder has a particle size of 18-53 um.

7. The method for realizing the high-speed cladding of the hollow offset-focus annular laser according to claim 1, wherein in step IV, the scanning speed of the laser is 0.15-0.6 m/s.

8. The method for realizing the high-speed cladding of the hollow offset-focus annular laser according to claim 1, wherein in step VI, the shielding gas comprises a rare gas, and a pressure of the shielding gas ranges from 0.1-0.3 bar.

9. The method for realizing the high-speed cladding of the hollow offset-focus annular laser according to claim 8, wherein the shielding gas is nitrogen or argon.

10. The method for realizing the high-speed cladding of the hollow offset-focus annular laser according to claim 1, wherein in step VII, the matrix is a pipe; a sprayer head is located right above the pipe and constantly moves in an axial direction of the pipe to form a threaded overlap cladding layer,
- or, the matrix is a vertical plane, and the sprayer head performs high-speed cladding on a vertical plane to generate a surface coating layer,
- or, the matrix is an irregular curved surface, and the sprayer head performs free-form fabrication on the irregular curved surface.

* * * * *